United States Patent
Prateek et al.

(10) Patent No.: US 12,314,234 B1
(45) Date of Patent: May 27, 2025

(54) DATABASE MIGRATION FOR NEW REGIONS AND DISPARATE CUSTOMER ACCOUNTS

(71) Applicant: Amazon Technologies, Inc., Seattle, WA (US)

(72) Inventors: Anuj Prateek, Coquitlam (CA); Juan-Pierre Longmore, Bellevue, WA (US); Christopher S. Vasquez, Springfield, VA (US); Eric Wei, Seattle, WA (US); Pooja Madan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/693,073

(22) Filed: Mar. 11, 2022

(51) Int. Cl.
*G06F 16/21* (2019.01)
*G06F 9/455* (2018.01)
*G06F 9/48* (2006.01)
*G06F 16/22* (2019.01)
*H04L 9/40* (2022.01)

(52) U.S. Cl.
CPC ........ *G06F 16/214* (2019.01); *G06F 9/45558* (2013.01); *G06F 9/4806* (2013.01); *G06F 16/2228* (2019.01); *G06F 16/2282* (2019.01); *H04L 63/083* (2013.01); *G06F 2009/45595* (2013.01)

(58) Field of Classification Search
CPC ............... G06F 16/214; G06F 9/45558; G06F 16/2282; G06F 16/256; G06F 2009/45595; G06F 16/2228; H04L 63/083
See application file for complete search history.

(56) References Cited

U.S. PATENT DOCUMENTS

| | | | | |
|---|---|---|---|---|
| 7,464,099 B2* | 12/2008 | Irons | ..................... | G06F 16/258 |
| 10,691,653 B1* | 6/2020 | Aiken | .................... | G06F 16/258 |
| 2006/0195436 A1* | 8/2006 | Levesque | .................. | G06F 8/71 |
| 2014/0188869 A1* | 7/2014 | Beckmann | ............ | G06F 16/185 |
| | | | | 707/736 |
| 2015/0120672 A1* | 4/2015 | Joglekar | ............... | G06F 3/0647 |
| | | | | 707/667 |
| 2016/0246832 A1* | 8/2016 | Eberlein | ................. | G06F 8/656 |
| 2017/0046143 A1* | 2/2017 | Kochhar | ................... | G06F 8/71 |
| 2017/0103083 A1* | 4/2017 | von Thienen | ....... | G06F 16/2228 |
| 2017/0302754 A1* | 10/2017 | Busatta | ................. | G06F 16/972 |
| 2020/0066392 A1* | 2/2020 | Bess | ..................... | G16H 30/20 |

* cited by examiner

*Primary Examiner* — Cheyne D Ly
(74) *Attorney, Agent, or Firm* — Knobbe, Martens, Olson & Bear, LLP

(57) ABSTRACT

When a request to transition use of a first data store to a second data store is identified (e.g., when a new regional computing stack is to be brought online in a network), tables in the second data store are created that correspond to respective ones of tables of the first data store. Data items are then accessed from the first data store and translated into a format interpretable by a remote data storage service. Thereafter, a network-based application programming interface (API) call is performed to store the data items in the remote data storage service using the data items in the second format. The data items as stored in the remote storage service are accessed and imported into the second data store.

20 Claims, 6 Drawing Sheets

DATABASE MIGRATION FOR NEW REGIONS AND DISPARATE CUSTOMER ACCOUNTS

BACKGROUND

Enterprises and other organizations offer network services that are utilized by various computing applications when performing enterprise-related tasks. These network services may include data storage, video streaming, machine learning, "serverless" computing, and other network services offered using physical and virtual computing resources of one or more data centers. New data centers and other enterprise-related infrastructure, such as fulfillment centers or regional computing centers, are often opened or brought online to account for increasing consumer demand for network services in various geographical regions. However, when a new data center or other facility is opened, network and computing services must be provided to integrate the data center, fulfillment center, or other facility in existing networking and computing infrastructure.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6 is a schematic block diagram that provides one example illustration of a computing environment employed in the networked environment of FIG. 1 according to various embodiments of the present disclosure.

DETAILED DESCRIPTION

Figure 1:
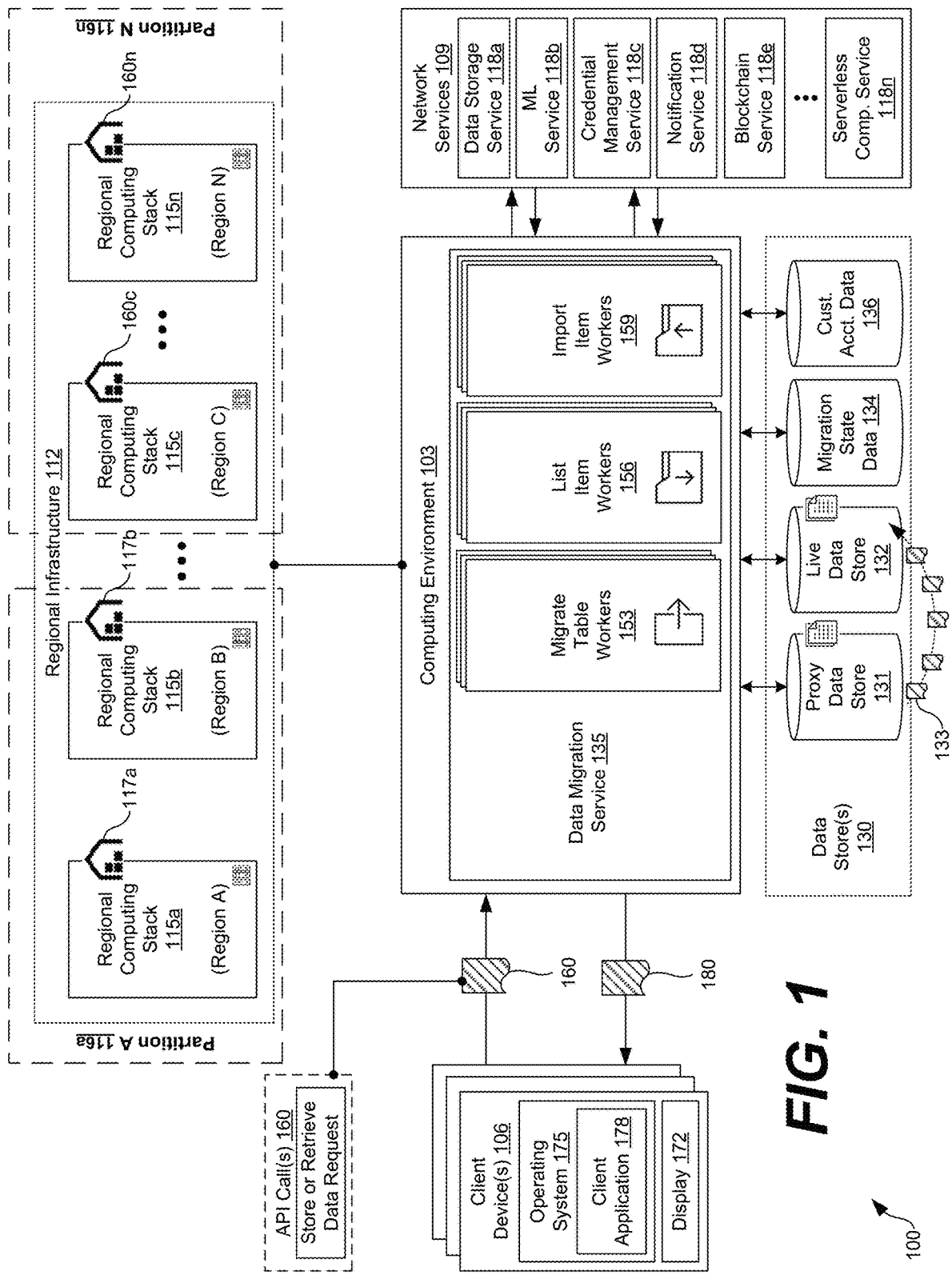
FIG. 1 is a drawing of a networked environment for data store migration according to various embodiments of the present disclosure.

The present disclosure relates to database migration for new regions and disparate customer accounts. Various development teams in an enterprise may rely on a database service, such as an SQL or "no-SQL" database service, to store data. The data may be required to serve up network services, store data in association with customer or other user accounts, maintain user credentials, and so forth. However, when a new facility comes online or a regional computing stack is deployed, referred to herein as a "region build," establishing or otherwise providing a data store for developers to utilize is not an instantaneous task. As a result, databases and associated services are often not available during early stages of a region build. This provides a bottleneck for development teams.

To this effect, administrators may provide a development team with a temporary data store, referred to herein as a proxy data store, to use in the interim while a live data store, to be utilized more permanently, is provisioned and configured. The proxy data store may include a data store having no reliance on the real data store. However, when administrators complete provisioning and the configuration of a live data store for a new region build, the administrators must seed the live data store with data previously stored in the proxy data store. Moving data between the proxy data store and the live data store can involve bringing down the proxy data store and impacting new region builds by imposing outages that can last multiple days or weeks.

For example, assume a database or other data store is brought live at time $t_0$ whereas the new region build must go live at $t_{ga}$. Database administrators are required to move data from the proxy data store to a live data store in time $t=t_{ga}-t_0$. Current best practices for the migration of a database require transferring portions of the proxy data store to the live data store to in a fraction of t to avoid database and service outages. On the other hand, development teams have to survive outages and track migration status before the development teams are able to begin using a live data store, otherwise risking a "split-brain" or, in other words, data residing in different data stores.

Embodiments are described herein for providing a cross-account data copy and migration system that is distributed such that a large amount of data copy can be performed between various user accounts, such as user accounts of a network service provider. In some scenarios, the data copy can be employed for service teams (e.g., teams of developers that create and maintain network services) of a network service provider, namely, to migrate data from a proxy data store to a live data store associated with a particular user account.

Accordingly, a computing environment is described that may include one or more computing devices that, through execution of program instructions, is directed to migrate data from a proxy data store (e.g., a first data store) associated with an administrator account (e.g., a first user account) to a live store (e.g., a second data store) associated with a developer account (e.g., a second user account).

In a first stage of migrating data from a proxy data store to a live data store, the computing environment associated with an administrator account may provide a live data store having tables that correspond to those of a proxy data store associated with a developer account. In some embodiments, at this stage, indexes are not created and read/write (R/W) capacity is set to a predetermined setting (e.g., Pay Per Request).

In a second stage, the computing environment may export data items stored in the tables of the proxy data store. The exported data items may be stored in a predetermined format (e.g., JSON, XML, YAML, CSV, and the like). The predetermined format may include a format interpretable by a remote service when a storage request is made using the predetermined format. An inventory of all the exported data items may be stored in a table of a data store.

In a third stage, the computing environment may spawn or otherwise execute import workers, where the import workers may include virtual processes (e.g., threads, operating system processes, containers, virtual machines, and the like). The import workers may be configured to identify the inventory of the exported data items, download the exported data items, and then copy the exported data items into tables of a live data store (e.g., a live data store associated with a user account).

In a fourth stage, the computing environment may update the tables of the live data store created for developers or other customers of a network service with sets of indices, desired R/W capacity, and the like. While various embodiments described herein are described with respect to stages, it is understood that two or more of the stages may include operations that overlap, or entireties of stages may overlap. As such, the stages do not necessarily imply order.

In the following discussion, a general description of the system and its components is provided, followed by a discussion of the operation of the same.

With reference to FIG. 1, a networked environment 100 is shown according to various embodiments. The networked environment 100 includes a computing environment 103, a client device 106, and various network services 109, which are in data communication with each other via a network. The network includes, for example, the Internet, intranets, extranets, wide area networks (WANs), local area networks (LANs), wired networks, wireless networks, or other suitable networks, etc., or any combination of two or more such networks. Such networks may include satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

In instances in which computing devices of the computing environment 103 are distributed in different geographical regions or locations, the computing devices may make up regional infrastructure 112. For instance, one or more computing devices or other computing infrastructure may form one or more regional computing stacks 115a . . . 115n (collectively "regional computing stacks 115"). Each of the regional computing stacks 115 may serve a region, such as a country or portion of a country, to account for demand of computing services, provide consumers with various goods, etc. As such, the regional computing stacks 115 may include those physically located in a facility 117a . . . 117n (collectively "facilities 117"), where the facility 117 may include a data center, fulfillment center, or other installation as may be appreciated.

In one example, a first regional computing stack 115a may provide electronic commerce-related web services that serve consumers in Japan, whereas a second regional computing stack 115b provides database storage web services for the Eastern portion of the United States. In another example, even though the regional computing stacks 115 are distributed geographically, they may work in conjunction to provide a web service accessible from any region of a country or group of countries. As may be appreciated, each regional computing stack 115 may include physical computing infrastructure, such as such as servers, memory devices, switches, routers, and other physical computing and network equipment. Additionally, each regional computing stack 115 may operate software and virtual resources on the physical infrastructure to provide various computing services, such as the network services 109, as will be described.

One or more of the regional computing stacks 115 may form up computing partitions 116a . . . 116n (collectively "computing partitions 116"). Computing partitions 116 include logically isolated portions of a computing network. In some examples, a computing partition 116 may be established for a geographical territory, such as a first computing partition 116a for the United States, a second computing partition 116b for China, a third computing partition 116c for Japan, and so forth. While a user account may include credentials for accessing a computing stack 115 in a first computing partition 116a, the same credentials would not work in accessing a computing stack 115 in a second computing partition 116b.

The network services 109 may include web services in some examples that can be invoked using a network service call or an application programming interface (API) call made to an application programming interface. A network API refers to an interface and/or communication protocol between a client and a server, such that if the client makes a request in a predefined format, the client should receive a response in a specific format or initiate a predefined action.

In a cloud provider network context, APIs provide a gateway for customers to access cloud infrastructure by allowing customers to obtain data from or cause actions within the cloud provider network, enabling development of applications that interact with resources and services hosted in the cloud provider network. APIs can also enable different services of the cloud provider network to exchange data with one another. The network services 109 may be independent of the computing environment 103 in some examples, and may be operated by a third-party. Alternatively, the network services 109 may be a portion of the computing environment 103, and may be maintained and/or operated by a common entity. In some embodiments, the regional computing stacks 115 include regional infrastructure 112 for serving up the network services 109.

The regional infrastructure 112 may be formed as a number of regions, where a region is a geographical area in which a computing provider clusters data centers or other infrastructure. Each region can include two or more availability zones (AZs) connected to one another via a private high speed network such as, for example, a fiber communication connection. An availability zone (also termed availability domains or, simply "zones" in various embodiments) refers to an isolated failure domain including one or more data center facilities with separate power, separate networking, and/or separate cooling from those in another availability zone.

Availability zones within a region may be positioned far enough away from one other that the same natural disaster should not take more than one availability zone offline at the same time. Customers may connect to availability zones of the computing provider network via a publicly accessible network (e.g., the Internet or a cellular communication network). Transit Centers (TC) are the primary backbone locations linking customers to the cloud provider network, and may be co-located at other network provider facilities (e.g., Internet service providers or telecommunications providers). Each region can operate two TCs for redundancy.

Even further, in accordance with various embodiments, the network services 109 may include a data storage service 118a, a machine learning (ML) service 118b, a credential management service 118c, a notification service 118d, a blockchain service 118e, a serverless computing service 118n (also referred to as a function compute service, on-demand code execution service, functions service, cloud functions service, or functions as a service, in various implementations), a video streaming service, an elastic compute cloud service (also referred to as an elastic compute service, virtual machines service, computing cloud service, compute engine, or cloud compute service in various implementations), as well as other types of network services 109 as can be appreciated. The data storage service 118 may be an elastic block store service (also referred to as a cloud disks service, managed disk service, storage area network service, persistent disk service, or block volumes, in various implementations) that supports customer volumes.

Various applications and other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

The components executed on the computing environment 103, for example, include a data migration service 135, and other applications, services, processes, systems, engines, or functionality not discussed in detail herein. In various embodiments, the data migration service 135 is executed to migrate data items from a proxy data store to a live data store, as will be described.

Development teams in an enterprise or other organization may rely on one or more of the data stores 130 to store and retrieve data. The data may be required to provide network services 109, store data in association with customer or other user accounts, maintain user credentials, and so forth. However, when a new region build occurs (e.g., bringing a new facility 117 and/or regional computing stack 115 online) establishing or otherwise providing a data store 130 for developers to utilize is not an instantaneous task. As such, data stores 130 and associated services are often not available during early stages of a region build.

To facilitate region builds, the data migration service 135 may provide instant or near-instant access to a proxy data store 131 that may be utilized by developers working on a region build while a live data store 132 is being provisioned, configured, or otherwise made available. As such, it is understood that the proxy data store 131 may be a development environment to be used temporarily by developers or other personnel, and the live data store 132 may be a more permanent-type data store. For instance, the proxy data store 131 may be used to store and retrieve data items 133 in a private development environment, whereas the live data store 132 may be used to store and retrieve data items 133 in a production environment that interacts with customers or end users.

To this end, the proxy data store 131 may not be utilized by extraneous services outside of an entity or other organization. For instance, the computing environment 103 may not serve up data from the proxy data store 131 to network services 109, client devices 106, or other requesting entities without having developer access and credentials. Instead, the proxy data store 131 may only serve up data to administrators, developers, or other authorized personnel during deployment of a new region build. Alternatively, the computing environment 103 may not serve up data from the proxy data store 131 to customers, whereas the data migration service 135 may provide data from the live data store 132 to customers or other requesting entities.

In various embodiments, the data migration service 135 may include migrate table workers 153, list item workers 156, import item workers 159, as well as other processes not described herein. The migrate table workers 153, list item workers 156, and/or import item workers 159 may each include a virtual process spawned to perform various operations in the migration of data from the proxy data store 131 to the live data store 132. As such, the virtual processes can include threads or operating system processes executing predefined code or logic, containers executing a script or application, virtual machines executing a script or application, and the like. It is understood that the migrate table workers 153, list item workers 156, and/or import item workers 159 may be spawned when an operation is required to be performed and terminated when the operation is completed to free up use of computing resources.

The migrate table workers 153, list item workers 156, and/or import item workers 159 may be executed in parallel and may operate in different computing partitions 116. For instance, in order to transition use of the proxy data store 131 residing in a first computing partition 116a to use of the live data store 132 in a second computing partition 116b, a migrate table worker 153, list item worker 156, and/or import item worker 159 may be spawned in a respective computing partition 116 where credentials of a respective user account are delegated to one of the migrate table workers 153, list item workers 156, and/or import item workers 159. Accordingly, cross-account and cross-partition data copy can be achieved.

The proxy data store 131 and the live data store 132 may include SQL, non-SQL, relational, and/or non-relationship databases in some examples. To this end, the proxy data store 131 and the live data store 132 may each include tables storing data items 133 in a structured relationship.

Beyond the proxy data store 131 and the live data store 132, the data stored in the data store 130 includes, for example, migration state data 134, customer account data 136, and potentially other data. The migration state data 134 may include information associated with a state of provisioning of the live data store 132. In some embodiments, the migration state data 134 may include a state of a migration of a proxy data store 131 to a live data store 132, such as "to be migrated," "migrating," "migrated," and the like. Additionally, in some embodiments, the migration state data 134 include a configurable flag that identifies whether the live data store 132 is active (e.g., public facing) or not. It is understood that when the live data store 132 is made active, the live data store 132 is used to retrieve data, which may be provided to customers, network services 109, or other requesting entities, as opposed to the proxy data store 131. The customer account data 136 may include information associated with various customer or user accounts, such as account credentials, account data allowances, preferred read/write settings, as well as other account data.

In various embodiments, the proxy data store 131 may be associated with a first user account, such as an administrator user account (e.g., an account of an administrator of a network service provider) whereas the live data store 132 may be associated with a second user account, such as a developer user account (e.g., a development team tasks with bringing online one of the network services 109 in a regional computing stack 115 or facility 117). Alternatively, in some embodiments, the proxy data store 131 and the live data store 132 may be associated with the same user accounts.

Further, according to various embodiments, the proxy data store 131 may include a first type of data store, such as an SQL data store, while the live data store 132 may include a second type of data store, such as a no-SQL data store. Alternatively, the proxy data store 131 and the live data store 132 may include the same or similar types of data stores. In some embodiments, the proxy data store 131 and/or the live data store 132 are DynamoDB® data stores. Results of API calls 160 and other queries may be returned as data vectors, or arrays of data, as may be appreciated.

The client device 106 is representative of a plurality of client devices that may be coupled to the network. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 178 and/or other applications. The client application 178 may be executed in a client device 106, for example, to access network content served up by the computing environment 103 and/or other servers, thereby rendering a user interface on the display 172. To this end, the client application 178 may comprise, for example, a browser, a dedicated application, etc., and the user interface may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, when a new region build occurs, the data migration service 135 may provide a team of developers or other individuals with a proxy data store 131, which may include a data store 130 of a regional computing stack 115 that is intended to act as a temporary data store. The team of developers may begin to store and retrieve data items 163 in the proxy data store 131 using an API call 160, as may be appreciated. While doing so, the data migration service 135 may begin provisioning a live data store 132 in a regional computing stack 115 (a same or different stack), where the live data store 132 is a more permanent type of data store 130.

When a regional computing stack 115 is deployed or when a "new region" is brought online, a developer account, an administrator account, or other personnel may send a request to the data migration service 135 to migrate data items 133 from the proxy data store 131 to the live data store 132. To migrate data from the proxy data store 131 to the live data store 132, the data migration service 135 may first create tables in the live data store 132 that correspond to tables of the proxy data store 131. In some embodiments, the data migration service 135 does not yet create any indexes for the live data store 132. Further, the data migration service 135 may set R/W capacity of the live data store 132 to a predetermined setting, such as "Pay Per Request," which is often employed for unpredictable workloads, or "Provisioned," which is often employed for predictable workloads.

Next, the data migration service 135 may export data items 133 stored in the tables of the proxy data store 131. The exported data items 133 may be stored locally (e.g., in local memory) in the computing environment 103 in a predetermined format, such as JSON, XML, YAML, CSV, and so forth. In some embodiments, the predetermined format may include a format interpretable by the data storage service 118a (or other remote storage service) when a storage request is made using the predetermined format. For example, if the data storage service 118a interprets data in a JSON format, the exported data items 133 may be stored locally in the computing environment 103 in the JSON format. The data migration service 135 may then generate an inventory of all the exported data items 133, which may be stored in the data store 130 (e.g., in a table of the data store 130).

Thereafter, the data migration service 135 may spawn or otherwise execute import workers 150. In various embodiments, the import item workers 159 may include virtual processes (e.g., threads, operating system processes, containers, virtual machines, and the like). The import item workers 159 may be configured to identify the inventory of the exported data items 133 from the data store 130, download the exported data items 133, and then copy the exported data items 133 into the tables of the live data store 132. Finally, the data migration service 135 may update the tables of the live data store 132 created for developers or other customers of a network service with sets of indices, desired R/W capacity, and the like. When the data items 133 are fully migrated from the proxy data store 131 to the live data store 132, a network service 109 deployed in a region (e.g., a regional computing stack 115) may transition from use of the proxy data store 131 to the live data store 132. As the migration of data is not instantaneous, the data migration service 135 may synchronize data items 133 between the proxy data store 131 and the live data store 132 without locking or bringing down the proxy data store 131 and the live data store 132. During the migration, a migration state may be provided to a client device 106 via a response 180. Alternatively, a notification of completion of a migration may be sent to a client device 106 via a response 180.

Figure 2:
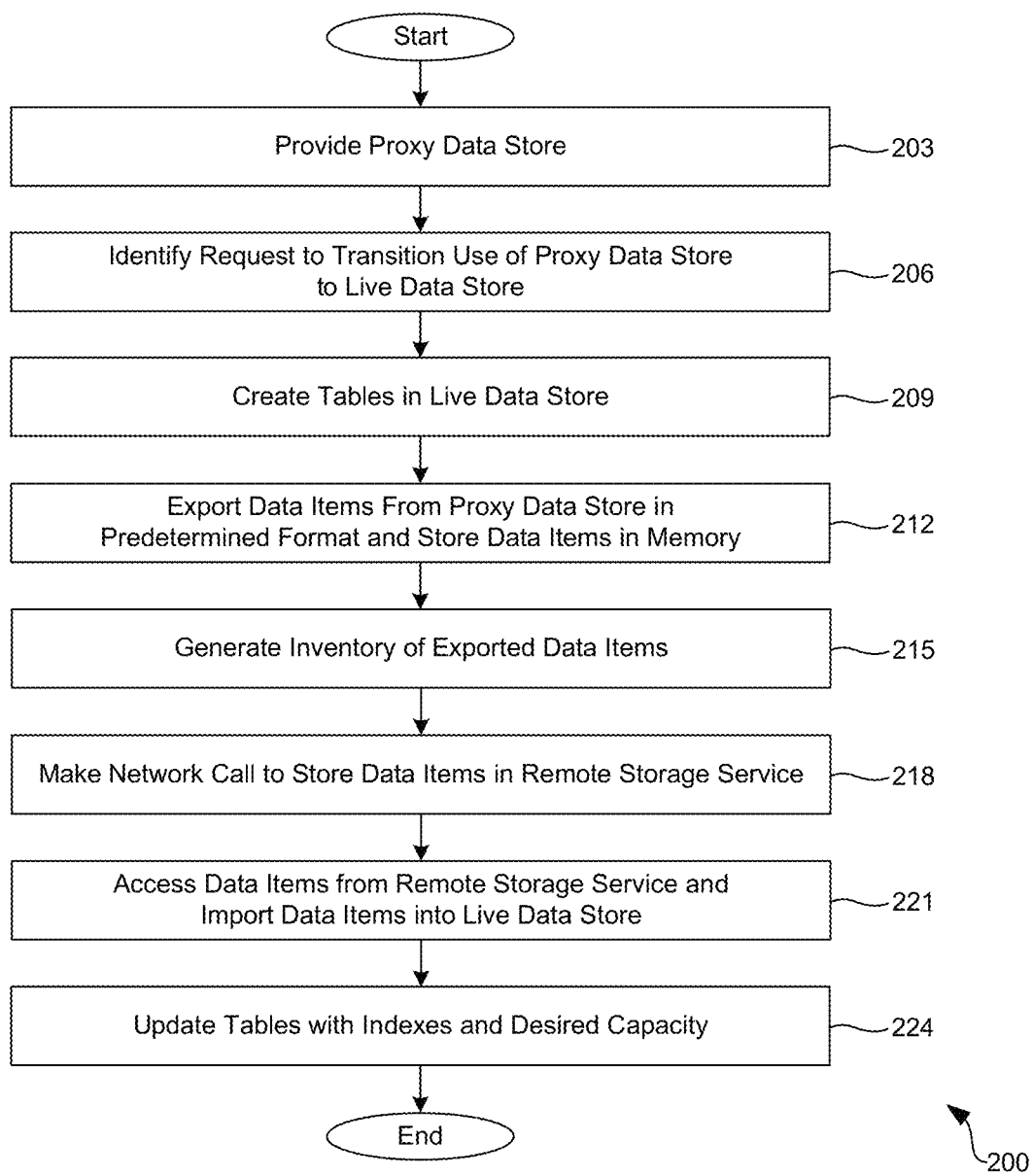
FIG. 2 is a flowchart illustrating one example of migrating data from a proxy data store to a live data store as executed in a computing environment in the networked environment of FIG. 1 according to various embodiments of the present disclosure.

Referring next to FIG. 2, a flowchart 200 is shown that provides one example of the operation of a portion of the data migration service 135 according to various embodiments. It is understood that the flowchart of FIG. 2 provides merely an example of the many different types of functional arrangements that may be employed to implement the operation of the portion of the data migration service 135 as described herein. As an alternative, the flowchart of FIG. 2 may be viewed as depicting an example of elements of a method implemented in the computing environment 103 according to one or more embodiments.

Beginning with box 203, the computing environment 103 may provide a proxy data store 131. An administrator (e.g., a network service provider) may provision the proxy data store 131 such that developers, through a developer account, may store data items 133 in and retrieve data items 133 from the proxy data store 131. In some examples, the proxy data store 131 is used by developers when deploying a service in a new region, such as one (or instances of) the network services 109 in a regional computing stack 115. A client device 106 utilized by a developer can make network API calls 160 to store data and retrieve data, as may be appreciated.

Next, at box 206, the data migration service 135 may identify a request to transition use of the proxy data store 131 to the live data store 132. In some examples, when a new region is intended to be deployed, the migration of data items 133 from the proxy data store 131 to the live data store 132 may be initiated a predetermined time ahead of the deployment (e.g., three days prior to a launch of a new region in which network services 109 are provided publicly to customers via their client devices 106). In some embodiments, an estimated time of migration may be determined based on a number of data items 133, an estimated size of each of the data items 133, and so forth. The migration may be initiated based on the estimated time of migration such that the migration is completed at or near the launch of the new region.

In box 209, the data migration service 135 may create tables in the live data store 132. In some embodiments, the data migration service 135 spawns migrate table workers 153 (e.g., threads, operating system processes, containers, virtual machines, and the like) that query the proxy data store 131 to identify a listing of the tables therein, and generate same or similar tables in the live data store 132. As such, the tables created in the live data store 132 may be the same as the tables in the proxy data store 131. In other words, the live data store 132 is provisioned such that the live data store 132 has tables that correspond to those of the proxy data store 131. In some embodiments, the data migration service 135 does not yet create indexes. However, the data migration service 135 may set R/W capacity a predetermined setting (e.g., Pay Per Request or Provisioned).

Next, in box 212, the data migration service 135 may export data items stored in the tables of the proxy data store 131 and store the data items 133 in memory. In some embodiments, the data migration service 135 spawns list item workers 156 (e.g., threads, operating system processes, containers, virtual machines, and the like) that download items to the data store 130 or, more specifically, to local memory of the computing environment 103. The exported data items may be converted to and stored in a predetermined format (if a conversion is required), such as JSON, XML, YAML, CSV, and the like, or stored as exported from the proxy data store 131. The predetermined format may include a format interpretable by a remote service, such as the data storage service 118a, when a storage request is made using the predetermined format.

An inventory of all the exported data items 133 may be stored in the data store 130. In some embodiments, the migrate table workers 153 and the list item workers 156 may execute in a first computing partition 116 in association with a first set of credentials for a first user account, whereas the import item workers 159, as will be discussed, may execute in a second computing partition 116 in association with a second set of credentials for a second user account. The first user account and the second user account may be different user accounts, and the first set of credentials and the second set of credentials may be partition-specific credentials and may thus be different from one another.

In box 215, the data migration service 135 may generate an inventory of the data items 133 exported in box 212. For instance, the inventory may include a list of all exported JSON data items 133 stored in a table of the data store 130. In some embodiments, the inventory includes an inventory metadata file that identifies each of the data items 133 exported in box 212. To this end, in some embodiments, the inventory metadata file includes a list of segment dump files corresponding to segments (or portions of data) of a table.

Thereafter, in box 218, the data migration service 135 may make one or more network calls to store the data items 133 exported in box 212 using the data storage service 118a or other remote data storage service. In box 221, in some embodiments, the data migration service 135 may spawn or otherwise execute import item workers 159 that access data items 133 from the data storage service 118a and import the data items 133 into the live data store 132. The import item workers 159 may include virtual processes, such as threads, operating system processes, containers, virtual machines, and the like executing in a computing partition 116 of the live data store 132, which may be different than a computing partition 116 of the proxy data store 131. The import item workers 159 may each be configured to identify the inventory of the data items 133 exported in box 212, retrieve the exported data items 133, and then copy the data items 133 into tables of the live data store 132 (e.g., a live data store associated with a user account).

In box 224, the data migration service 135 may update the tables of the live data store 132 created for developers or other customers of a network service 109 with sets of indices, desired R/W capacity, and the like. When the data items 133 are fully migrated from the proxy data store 131 to the live data store 132, a network service 109 deployed in a region (e.g., a regional computing stack 115) may transition from use of the proxy data store 131 to the live data store 132. As the migration of data is not instantaneous, the data migration service 135 may synchronize data items 133 between the proxy data store 131 and the live data store 132 without locking or bringing down the proxy data store 131 and the live data store 132. Thereafter, the process may proceed to completion.

Figure 3:
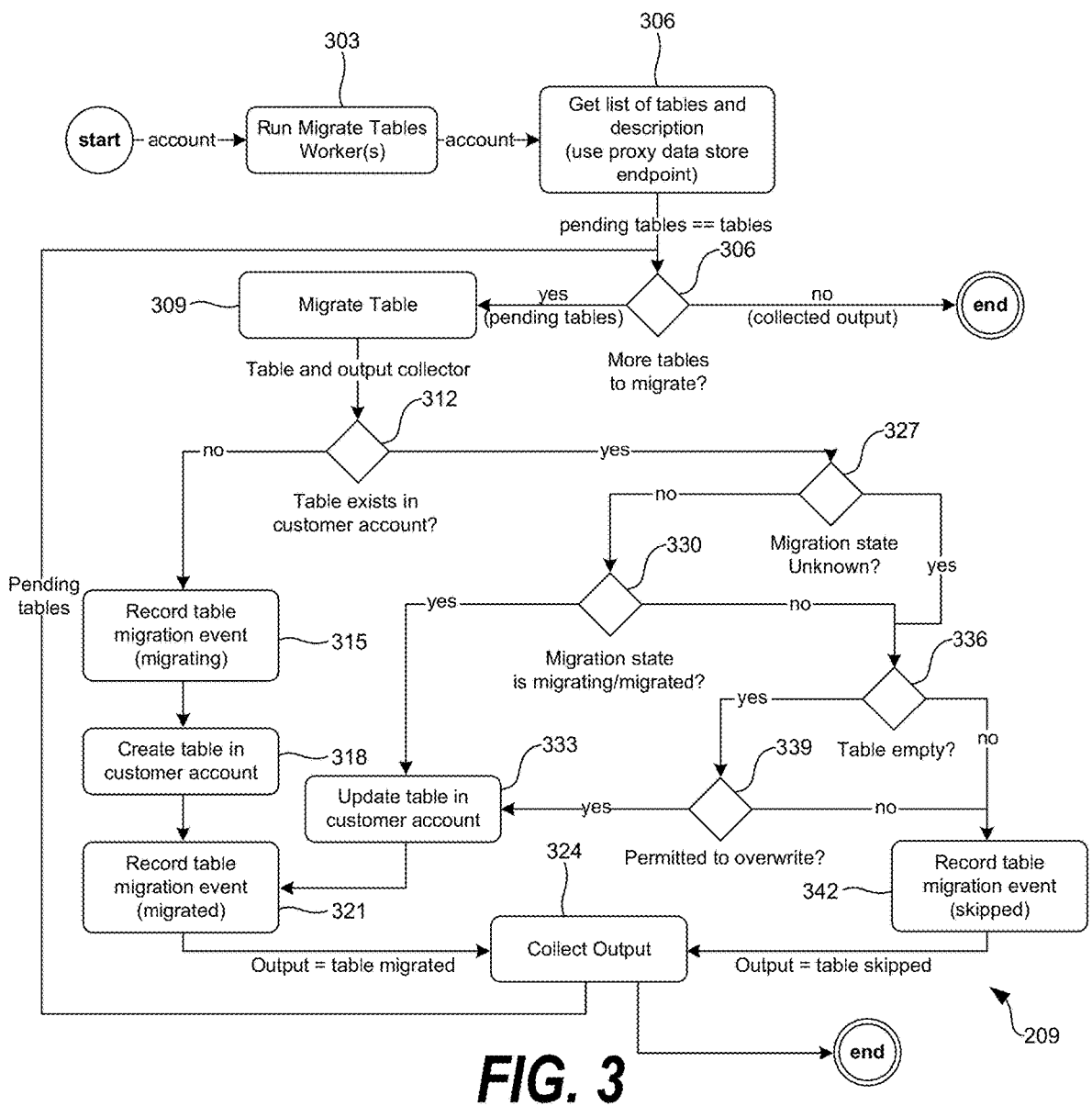
FIG. 3 is a flowchart illustrating one example of table creation in a live data store as executed in a computing environment in the networked environment of FIG. 1 according to various embodiments of the present disclosure.

Turning now to FIG. 3, a flowchart is shown that provides one example of the operation of a portion of the data migration service 135 according to various embodiments. It is understood that the flowchart of FIG. 3 provides merely an example of the many different types of functional arrangements that may be employed to implement the operation of the portion of the data migration service 135 as described herein. As an alternative, the flowchart of FIG. 3 may be viewed as depicting an example of elements of a method implemented in the computing environment 103 according to one or more embodiments.

The flowchart of FIG. 3 may include the operations shown in box 209 of FIG. 2 in some embodiments. For instance, FIG. 3 shows an example of table preparation in the live data store 132. To this end, the data migration service 135 may discovers customer tables in a data store 130 (e.g., the proxy data store 131) and copy the tables over into the real data store 132 in a customer account.

In some embodiments, before tables are copies, a customer account may be marked or labeled as "migrating" or other state that prevents access for services to obtain a description of a table. If a skipped or unknown existing table is identified it may be ignored. It some embodiments, when a table is created in a customer account, an index (e.g., a global summary index (GSI)) is created. However, in various embodiments, an index is not created during table creation, as creation of a GSI or other index impacts overall write throughput. As such, the embodiments described herein are directed towards utilizing computing resources more efficiently.

Beginning with box 303, the data migration service 135 may run a migrate table worker 153, where the migrate table worker 153 is a virtual process configured to perform predefined actions to create a live data store 132 having the same tables as the proxy data store 131. To this end, in box 306, the migrate table worker 153 may obtain a list of tables and/or a description of each of the tables using, for example, an endpoint associated with the proxy data store 131. It is understood that the proxy data store 131 is associated with a particular user account and credentials may be required for the migrate table worker 153.

Next, in box 306, the migrate table worker 153 determined whether there are any tables to migrate (or any more tables to migrate on subsequent iterations). If there are not further tables to migrate, the process can proceed to generate a provide an output and proceed to completion. Alternatively, if there are further tables to migrate, the process can proceed to box 309 to migrate a table. To do so, in box 312, the migrate table worker 153 may determine whether a table exists in a live data store 132 associated with a customer account.

If the table does not exist in the live data store 132 associated with a customer account, the process can proceed to box 315. At box 315, the migrate table worker 153 records the table migration event as "migrating," or other suitable event. Thereafter, in box 318, the migrate table worker 153 creates the table in the customer account (e.g., in the real data store 132) and then records a table migration event as "migrated." The process proceeds to box 324 where an output is collected and/or generated, and provided to a client device 106 or other requesting service. The process thereafter proceeds to completion.

Referring back to box 312, if the table does exist in the live data store 132 associated with a customer account, the process can proceed to box 327. In box 327, the migrate table worker 153 may determine whether a migration state is unknown. If the migration state is known the process may proceed to box 330.

In box 330, the migrate table worker 153 may determine whether a migration state is "migrating" or "migrated" and, if so, the process may proceed to box 333 where the table is updated in association with the customer account. Referring back to box 330, if the migration state is not "migrating" or "migrated," the process may proceed to box 336. In box 336, the migrate table worker 153 may determine whether the table is empty. If the table is empty, the process may proceed to box 339 where the migrate table worker 153 determine whether it is permitted to overwrite an existing table. If permitted, the process can proceed to box 333 to update the table in the customer account and the process proceeds as previously described.

Referring back to box 339, if the migrate table worker 153 is not permitted to overwrite an existing table, the process may proceed to box 342 where the migrate table worker 153 may record a table migration event as "skipped." Any skipped tables may be further evaluated manually by a developer or administrator, or the process of FIG. 3 may be performed again on the tables marked "skipped." Thereafter, the process proceeds to box 324 in line with the process as previously described. The process may ultimately proceed to completion, where an output is generated that may include a list of all the tables and their migration state (e.g., skipped, migrated, or migrating).

Figure 4:
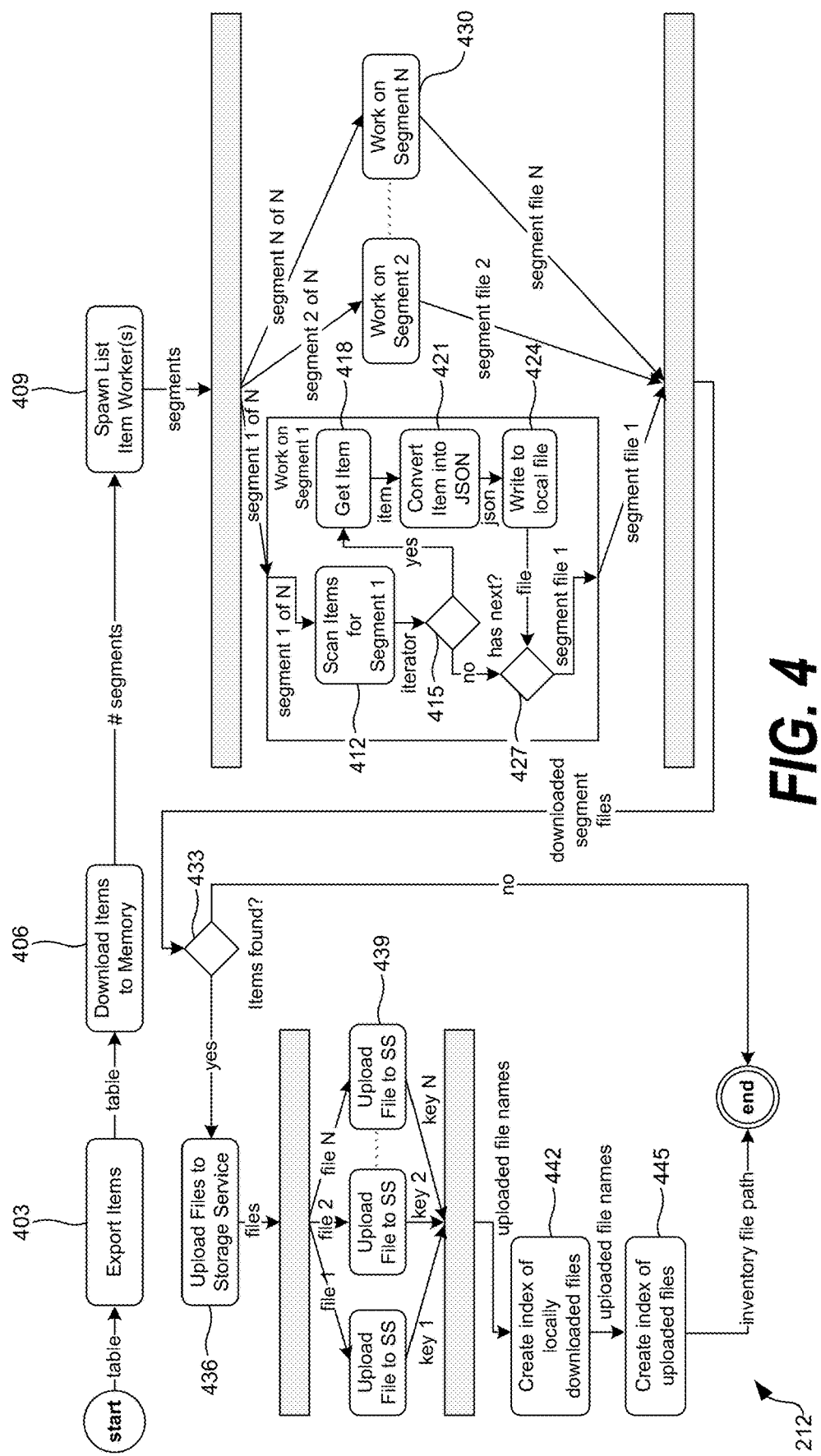
FIG. 4 is a flowchart illustrating one example of exporting data items from a proxy data store as executed in a computing environment in the networked environment of FIG. 1 according to various embodiments of the present disclosure.

Moving along to FIG. 4, a flowchart is shown that provides one example of the operation of a portion of the data migration service 135 according to various embodiments. It is understood that the flowchart of FIG. 4 provides merely an example of the many different types of functional arrangements that may be employed to implement the operation of the portion of the data migration service 135 as described herein. As an alternative, the flowchart of FIG. 4 may be viewed as depicting an example of elements of a method implemented in the computing environment 103 according to one or more embodiments.

The flowchart of FIG. 4 may include the operations shown in box 212 of FIG. 2 in some embodiments. For instance, FIG. 4 shows an example of exporting of data items 133 from the proxy data store 131. To this end, in some embodiments, the export of data items 133 from the proxy data store 131 may be performed in two phases. In a first phase, a parallel scan of the table may be performed (e.g., segments of the table) and data items 133 may be downloaded locally. In some embodiments, one file is downloaded per segment of the table. After all data items 133 are downloaded, an index file is generated having a list of all segment files. At this point, the download of the data items 133 may be complete. Thereafter, the segment files (e.g., files containing JSON items) may be uploaded or otherwise stored in the data storage service 118a. In a second phase, import item work may be generated which may start with the segment index file. An entry into an item import work queue may be added for every segment. The work items can later be picked up by import item workers 159 to copy items into customer tables of the live data store 132.

Beginning with box 403, the data migration service 135 may export data items 133 from the proxy data store 131 and, at box 406, the data items 133 may be stored in local memory of the data migration service 135 (e.g., data store 130). The data items 133 may be downloaded as a plurality of segments, which include data segments, portions of files, and/or portions of table data. Thereafter, in box 409, the data migration service 135 may spawn or otherwise execute list item workers 156.

For each of the segments, the list item workers 156 may, at box 412, scan the data items 133 for a particular segment (e.g., segment 1, segment 2, . . . , segment n) of a data item 133. The scan of the data items 133 may include a parallel scan operation, as may be appreciated. Then, at box 415, the list item workers 156 may determine whether a segment of a data item 133 has a next segment. If a file segment does not have a next segment, the process may skip to box 427, as will be described. Alternatively, if a file segment has a next segment, the process proceeds to box 418 to obtain the segment of the data item 133. In box 421, the list item worker 156 converts the data item 133 to a predetermined format and, in box 424, the list item worker writes the data item 133 to a local file. In some embodiments, the list item worker 156 write a single file per segment. In alternative embodiments, multiple files may be written per segment.

The predetermined format may include a format capable of interpretation by the data storage service 118a, for example, and, as such, may include JSON, XML, YAML, CSV, and the like. The process then proceed to box 427 where a segment file is outputted. It is understood that, as a first segment of a data item 133 is worked on, other segments of the data item 133 may be worked on in parallel using parallel scan operations and the like. For example, box 430 illustrates that N number of segments may be handled in parallel. Thereafter, downloaded segment files may be used to proceed to box 433. It is understood that the operations shown for representative segment 1 of N may be similarly applied to segment 2 of N, segment N of N, and so forth.

In box 433, the list item worker 156 determines whether a data item 133 has been found or passed along as an input. Next, in box 436, the list item worker 156 may upload segment files (or complete data items 133) to a data storage service 118a or other remote data storage service. To do so, in various embodiments, as shown in box 439, data items 133 or segments thereof, may be uploaded in parallel to the data storage service 118a using a network-based API call 160, as may be appreciated. After the upload operations are performed in parallel and completed, the uploaded file names may be outputted.

In box 442, the list item worker 156 may create an index of the locally downloaded files and, in box 445, the list item worker 156 may create an index of the uploaded files (e.g., the data items 133 uploaded to the data storage service 118a). Thereafter, an inventory file path may be outputted, and the process may proceed to completion.

In some embodiments, the export of the data items 133 shown in FIG. 4 may operate on a single table at a time. However, in alternative embodiments, an export of all tables for all accounts may be performed based on availability of list item workers 156, for example.

In some embodiments, all tables for a particular user account may be performed in parallel until completion. For instance, a discovery service may discover all tables for a given account and the tables may be added to a queue them for export, such as a first-in-first-out (FIFO) queue. Further, in various embodiments, multiple ones of the list item workers 156 may access tasks from the queue to perform and the list item workers 156 may export data items 133 for the tables in the queue.

In various embodiments, all segments of the data items 133 are first downloaded and then uploaded to the data storage service 118a. However, in alternative embodiments, as a segment dump or other segment of a data item 133 is generated, as soon as available, the segment dump or other portion of the data item 133 may be uploaded to the data storage service 118a as opposed to waiting for all segment scans to finish. In further embodiments, a resume option in export may be provided. If the resume option is used, the export may look at previously uploaded segments and only scan missing segments, as may be appreciated.

Segment dumps in some embodiments may be organized by a timestamp detailing a time at which the export was initiated. In alternative embodiments, non-temporal paths may be employed such that, after data items 133 are dumped (e.g., files corresponding to segment dumps are generated), an inventory metadata file may be generated. The inventory file may be uploaded along with the segment dump files to the data storage service 118a.

Figure 5:
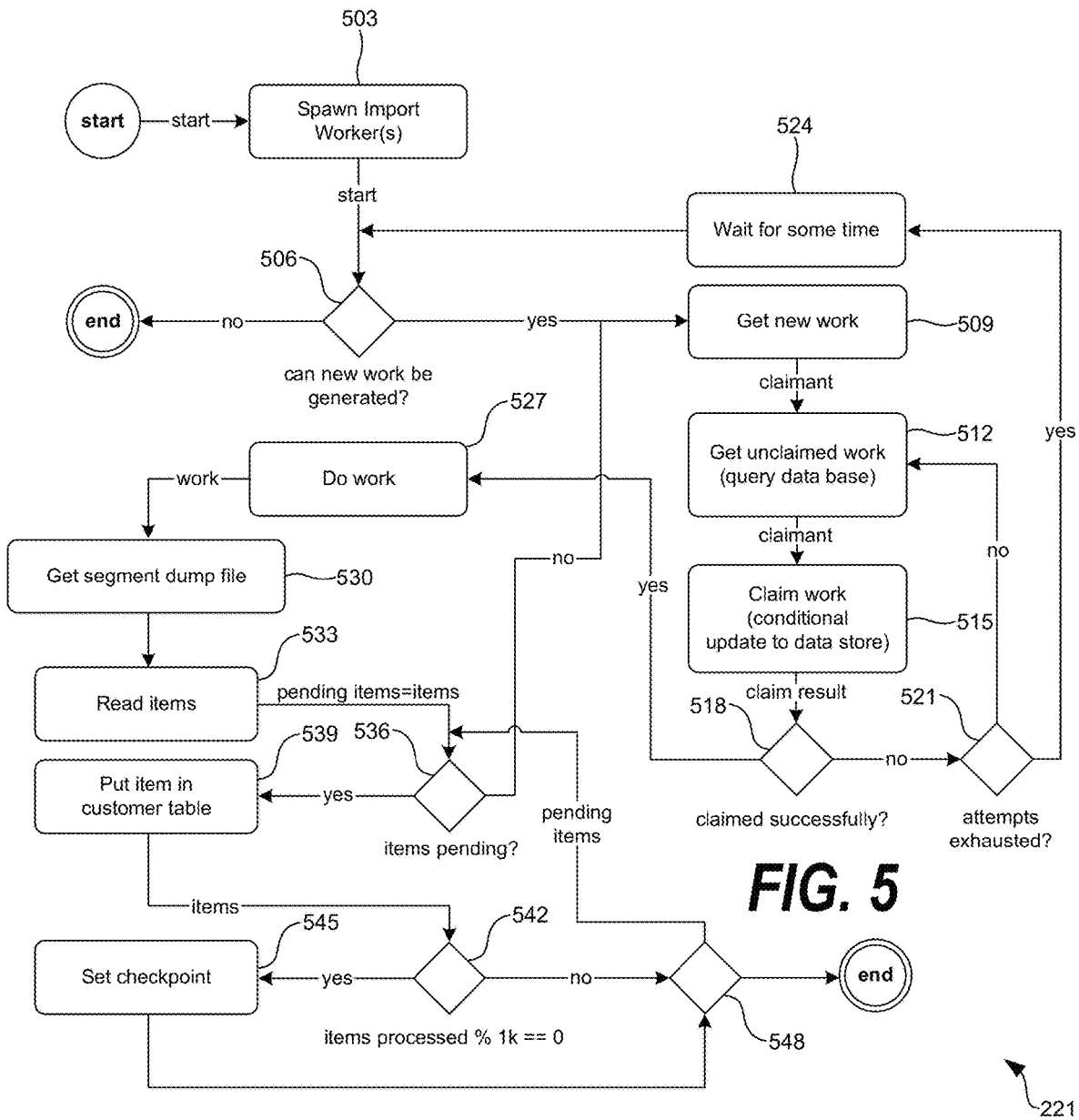
FIG. 5 is a flowchart illustrating one example of importing data items as exported from the proxy data store into a live data store as executed in a computing environment in the networked environment of FIG. 1 according to various embodiments of the present disclosure.

Turning now to FIG. 5, a flowchart is shown that provides one example of the operation of a portion of the data migration service 135 according to various embodiments. It is understood that the flowchart of FIG. 5 provides merely an example of the many different types of functional arrangements that may be employed to implement the operation of the portion of the data migration service 135 as described herein. As an alternative, the flowchart of FIG. 5 may be viewed as depicting an example of elements of a method implemented in the computing environment 103 according to one or more embodiments.

An inventory metadata file may include a file that contains a list of segment dump files generated in FIG. 4. An import of the segment dump files into the live data store 132 may be initiated after an export of the data items 133 completed in FIG. 4. The inventory file used may be the index of locally downloaded or uploaded files created in boxes 442 or 445.

The import of data items 133 may operate at the segment level in contrast to table level for item export in some embodiments. At the end of the item export, a queue may be generated with import work tasks. These work tasks may contain information about a destination account, destination table, a path to a segment dump (e.g., a segment containing JSON for items in a segment), etc. Multiple import item workers 159 may be spawned or otherwise executed that obtain work tasks from the queue and import items into the live data store 132 associated with a particular user account.

Beginning with box 503, the data migration service 135 may spawn or otherwise executed import item workers 159. The import item worker 159 may, at box 506, determine whether new work tasks can be generated. If new work cannot be generated, the process may proceed to completion. Alternatively, if new work can be generated, the process may proceed to box 509. In box 509, the import item worker 159 may obtain new a work task, for instance, from the queue having work tasks placed therein. At box 512, the import worker may obtain unclaimed work corresponding to the work task, for example, by querying the data store 130 or other memory.

At box 515, the import item worker 159 may claim the work task by conditionally updating the data store 130 to reflect, for example, that the work task has been claimed. Accordingly, at box 518, the import item worker 159 may determine whether the work task has been claimed successfully. If the work task has not been claimed successfully, the process may proceed to box 521 to continue making attempts to claim the work task. If a predetermined number of attempts have been tried without successfully claiming the work task, the process may proceed to box 524 to wait a predefined period of time and restart the process at box 506.

Referring back to box 518, if the work task has been claimed successfully, the process may proceed to box 527. At box 527 the import item worker 159 may perform the work task which may include, for example, importing a data item 133 or segment thereof in the real data store 132. To this end, at box 530, the import item worker 159 may obtain a segment dump file, for example, by querying the data storage service 118a. Thereafter, at box 533, the import item worker 159 may read the data items 133 and, at box 536, the import item worker 159 may determine, at box 536, whether any data items 133 are pending for import.

If no data items 133 are pending for import, the process may revert back to box 509 and the process may restart from box 509. Alternatively, if a data item 133 is pending for import, the process may proceed to box 539. In box 539, the data item 133 (or segment dump file) may be placed in a customer table of the live data store 132. A list of the imported items may be generated, and the process may proceed to box 542.

At box 542, the import item worker 159 may determine whether to set a checkpoint based on a number of the data items processed. For instance, assuming a checkpoint is set for every thousand data items 133 uploaded to the live data store 132, a modulus may be performed to determine whether a last data item uploaded is divisible by one thousand. If a checkpoint is to be performed, at box 545, the import item worker 159 sets a checkpoint which may be used to resume import operations if halted or otherwise interrupted. The process may then proceed to box 548. Likewise, referring again to box 542, if no checkpoint is to be set, the process may proceed to box 546.

At box 546, the import item worker 159 may determine whether any additional pending items are remaining for import. If so, the process may revert to box 536 to continue the import of data items 133 into the real data store 132. Alternatively, if no data items 133 are pending for import, the process may proceed to completion.

Figure 6:
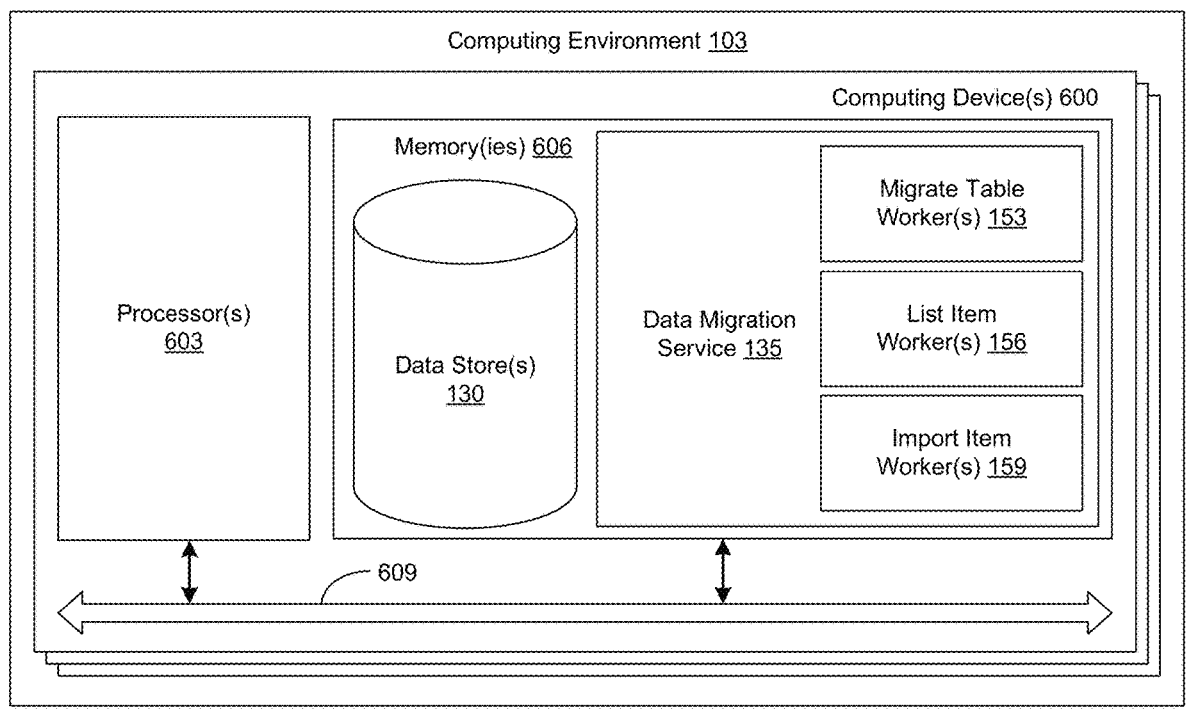
FIG. 6 illustrates a schematic block diagram of the computing environment according to an embodiment of the present disclosure.

With reference to FIG. 6, a schematic block diagram of the computing environment 103 is shown according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the data migration service 135, the migrate table workers 153, the list item workers 156, the import item workers 159, and potentially other applications. Also stored in the memory 606 may be a data store 130 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the data migration service 135, the migrate table workers 153, the list item workers 156, the import item workers 159, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-8 show the functionality and operation of an implementation of portions of the computing environment. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-8 show a specific order of execution, it is understood that the order of execution may differ from that which is depicted. For example, the order of execution of two or more blocks may be scrambled relative to the order shown. Also, two or more blocks shown in succession in FIGS. 3-8 may be executed concurrently or with partial concurrence. Further, in some embodiments, one or more of the blocks shown in FIGS. 3-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data migration service 135, the migrate table workers 153, the list item workers 156, and the import item workers 159, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the data migration service 135, the migrate table workers 153, the list item workers 156, and the import item workers 159, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device;
   executable program instructions stored in memory of the at least one computing device that, when executed, direct the at least one computing device to:
   identify a request to transition use of a first data store associated with a first user account that utilizes a first set of credentials to a second data store associated with a second user account that utilizes a second set of credentials;
   in response to the request, create tables in the second data store that correspond to respective ones of tables of the first data store;
   in response to a completion of the tables being created in the second data store, spawn at least one list item worker;
   export data items from the first data store and store the data items in the memory with the at least one list item worker, wherein the at least one list item worker is configured to perform a plurality of parallel scan operations and download a plurality of segments of the first data store in parallel, and wherein the plurality of segments are equally sized portions of a respective table of the first data store;
   after the data items are stored in the memory, perform a network-based application programming interface (API) call to store the data items in a remote data storage service; and
   access the data items as stored in the remote storage service, download the data items from the remote storage service, and import the data items as accessed into the second data store.

2. The system of claim 1, wherein the first data store is associated with a first user account in a first computing partition and the second data store is associated with a second user account in a second computing partition, wherein the export of the data items from the first data store utilizes credentials of the first user account, and the import of the data items into the second data store utilizes credentials of the second user account.

3. The system of claim 2, wherein the request to transition use is generated in response to a new regional computing stack being deployed in a networked environment where network services are deployed in the new regional computing stack.

4. The system of claim 3, wherein:
   the new regional computing stack is one of a plurality of regional computing stacks;
   the first user account is an administrator account of a network service provider that oversees the regional computing stacks and a networked environment in which the regional computing stacks are deployed; and
   the second user account is a developer account of a developer of a network service to be deployed in the new regional computing stack.

5. The system of claim 1, wherein the tables in the second data store are created by at least one migrate table worker spawned in response to the request to transition use of the first data store to the second data store, the at least one migrate table worker being a virtual process executed by the at least one computing device.

6. The system of claim 1, wherein, the at least one list item worker is a virtual process executed by the at least one computing device.

7. The system of claim 1, wherein the at least one list item worker is further configured to transform a segment in a first format to a data structure in a second format, wherein the second format is different from the first format and is a format interpretable by the remote data storage service.

8. The system of claim 7, wherein the at least one list item worker is further configured to generate an index of locally downloaded files and an index of uploaded files, wherein the import of the data items into the second data store utilizes at least one of the index of locally downloaded files and the index of uploaded files.

9. The system of claim 8, wherein the at least one list item worker is further configured to upload the plurality of segments to the remote data storage service in parallel.

10. The system of claim 1, wherein the data items are downloaded from the remote data storage service and imported into the second data store by at least one import item worker spawned in response to a completion of the data items being stored in the remote data storage service, the at least one list item worker being a virtual process executed by the at least one computing device.

11. A computer-implemented method, comprising:
maintaining a first data store in association with a first user account in a first computing partition and a second data store in association with a second user account in a second computing partition, the first user account and the second user account being different user accounts and the first computing partition being logically isolated from the second computing partition;
in response to a request to transition use of the first data store to the second data store being identified, creating a plurality of tables in the second data store that correspond to respective ones of tables of the first data store;
after the tables are created in the second data store, spawning at least one list item worker;
accessing data items from the first data store and translating the data items from a first format to a second format different than the first format, the second format being a format interpretable by a remote data storage service;
after the data items are accessed from the first data store, performing a network-based application programming interface (API) call to store the data items in the remote data storage service using the data items in the second format using the list item worker;
performing a plurality of parallel scan operations and downloading a plurality of segments of the first data store in parallel using the list item worker, wherein the plurality of segments are equally sized portions of a respective table of the first data store; and
accessing the data items as stored in the remote storage service, downloading the data items from the remote storage service, and importing the data items as accessed into the second data store.

12. The computer-implemented method of claim 11, wherein:
the request to transition use is generated in response to a new regional computing stack being deployed in a networked environment where network services are deployed in the new regional computing stack;
accessing the data items from the first data store utilizes credentials of the first user account; and
importing the data items into the second data store utilizes credentials of the second user account.

13. The computer-implemented method of claim 12, wherein:
the new regional computing stack is one of a plurality of regional computing stacks;
the first user account is an administrator account of a network service provider that oversees the regional computing stacks and a networked environment in which the regional computing stacks are deployed; and
the second user account is a developer account of a developer of a network service to be deployed in the new regional computing stack.

14. The computer-implemented method of claim 11, further comprising spawning at least one migrate table worker in response to the request to transition use of the first data store to the second data store being identified,
wherein the at least one migrate table worker is a virtual process executed by at least one computing device, and the tables in the second data store are created by the at least one migrate table worker.

15. The computer-implemented method of claim 11, further comprising spawning the at least one list item worker in response to a completion of creation of the tables in the second data store,
wherein the at least one list item worker is a virtual process executed by at least one computing device, and the data items are exported from the first data store and stored in a memory by the at least one list item worker, and
wherein the at least one list item worker is further configured to transform a segment in a first format to a data structure in a second format, wherein the second format is different from the first format and is a format interpretable by the remote data storage service.

16. The computer-implemented method of claim 11, further comprising spawning at least one import item worker in response to a completion of the data items being stored in the remote data storage service,
wherein the at least one list item worker is a virtual process executed by at least one computing device, and the data items are downloaded from the remote data storage service and imported into the second data store by at least one import item worker.

17. A non-transitory, computer-readable medium, comprising machine-readable instructions that, when executed by a processor of a computing device, cause the computing device to at least:
maintain a first data store in association with a first user account in a first computing partition and a second data store in association with a second user account in a second computing partition, the first user account and the second user account being different user accounts and the first computing partition being logically isolated from the second computing partition;
in response to a request to transition use of the first data store to the second data store being identified, create a plurality of tables in the second data store that correspond to respective ones of tables of the first data store;
after the tables are created in the second data store, spawn at least one list item worker;
access data items from the first data store and translating the data items from a first format to a second format different than the first format, the second format being a format interpretable by a remote data storage service;
after the data items are accessed from the first data store, perform a network-based application programming interface (API) call to store the data items in the remote data storage service using the data items in the second format using the at least one list item worker;
perform a plurality of parallel scan operations and download a plurality of segments of the first data store in parallel using the at least one list item worker, wherein the plurality of segments are equally sized portions of a respective table of the first data store; and access the data items as stored in the remote storage service and importing the data items as accessed into the second data store.

18. The non-transitory, computer-readable medium of claim 17, wherein:
the request to transition use is generated in response to a new regional computing stack being deployed in a networked environment where network services are deployed in the new regional computing stack;
accessing the data items from the first data store utilizes credentials of the first user account; and
importing the data items into the second data store utilizes credentials of the second user account.

19. The non-transitory, computer-readable medium of claim 17, wherein the machine-readable instructions, when executed by the processor, further cause the computing device to at least spawn at least one migrate table worker in response to the request to transition use of the first data store to the second data store being identified, wherein the at least one migrate table worker is a virtual process executed by at least one computing device, and the tables in the second data store are created by the at least one migrate table worker.

20. The non-transitory, computer-readable medium of claim 17, wherein the at least one list item worker is spawned in response to a completion of the tables being created in the second data store, the at least one list item worker being a virtual process executed by at least one computing device.

* * * * *